United States Patent
He et al.

(10) Patent No.: US 7,391,803 B2
(45) Date of Patent: Jun. 24, 2008

(54) INTERFERENCE SUPPRESSION IN A RECEIVER DURING AT LEAST ONE OF IDLE STATE AND ACCESS STATE OPERATION

(75) Inventors: Tao He, San Diego, CA (US); Jignesh Shah, San Diego, CA (US); Jian Huang, Poway, CA (US)

(73) Assignee: Nokia Corporation, Espoo (FI)

( * ) Notice: Subject to any disclaimer, the term of this patent is extended or adjusted under 35 U.S.C. 154(b) by 717 days.

(21) Appl. No.: 10/653,509

(22) Filed: Sep. 2, 2003

(65) Prior Publication Data
US 2005/0047484 A1 Mar. 3, 2005

(51) Int. Cl.
*H04B 1/707* (2006.01)
(52) U.S. Cl. ........................ 375/142; 375/144; 375/148; 375/150
(58) Field of Classification Search ................ 375/148, 375/144, 150, 142; 370/342, 320, 335, 441; 455/423, 425, 450, 501, 515, 63.1
See application file for complete search history.

(56) References Cited

U.S. PATENT DOCUMENTS

| | | | | |
|---|---|---|---|---|
| 5,598,428 A * | 1/1997 | Sato | | 375/148 |
| 5,894,473 A * | 4/1999 | Dent | | 370/342 |
| 6,067,292 A * | 5/2000 | Huang et al. | | 370/342 |
| 6,539,006 B1 * | 3/2003 | Taylor | | 370/335 |
| 6,570,909 B1 * | 5/2003 | Kansakoski et al. | | 375/148 |
| 6,625,132 B1 * | 9/2003 | Boettger et al. | | 370/329 |
| 2003/0035393 A1* | 2/2003 | Sinnarajah et al. | | 370/335 |
| 2003/0119451 A1 | 6/2003 | Jang et al. | | |
| 2004/0180661 A1* | 9/2004 | Chen et al. | | 455/436 |

FOREIGN PATENT DOCUMENTS

EP  1 176 746 A1  1/2002

* cited by examiner

*Primary Examiner*—Don N Vo
(74) *Attorney, Agent, or Firm*—Alston & Bird LLP (57) ABSTRACT

A system and method are provided for canceling interference present in a local channel signal received at a receiver. The system includes a controller and a finger demodulator assembly. The controller is capable of selecting at least one interfering pilot channel signal that has a signal strength above a threshold, where the selected interfering pilot channel signals comprises an interfering set of pilot channel signals. The finger demodulator assembly can then be capable of producing a corrected local channel signal based upon the interfering set of pilot channel signals during the idle state and/or access state.

30 Claims, 5 Drawing Sheets

INTERFERENCE SUPPRESSION IN A RECEIVER DURING AT LEAST ONE OF IDLE STATE AND ACCESS STATE OPERATION

FIELD OF THE INVENTION

The present invention relates generally to a system and method for suppressing interference in signals received by a mobile station, and more particularly, relates to systems and methods for suppressing interference in a local channel signal during idle state and/or access state operation of a code-division multiple access (CDMA) mobile station.

BACKGROUND OF THE INVENTION

In accordance with Telecommunications Industry Association (TIA) standard IS-95, the CDMA (Code Division Multiple Access) cellular radio system comprises a set of mobile stations and base stations. In the CDMA system, each base station continuously operates a pilot channel. If the base station has several sectors or beams, each sector or beam of the base station typically operates a specific pilot channel. It is previously known to use a pilot channel for identifying a base station, or a beam or sector of the base station. Each pilot channel signal typically comprises a spread-coded signal without data modulation that is continuously sent by the respective base station signal to its coverage area. The mobile station may identify the base station transceiver units by the pilot channel signal because the phases of the spreading codes in the pilot channel signal differ from one another.

In operation, upon power-up or entry into the system, each mobile station must typically initially acquire a pilot channel, typically the strongest pilot channel, of a local base station. Upon acquiring the pilot channel, when the mobile station does not have a connection on a normal traffic channel, the mobile station operates in an idle state by monitoring the paging channel of the local base station operating the respective pilot channel. Then, when necessary, the mobile station switches operation to an access state by sending messages on an access channel to the local base station, and continues to monitor the respective paging channel. When a connection is established between the mobile station and the local base station, either the mobile station or the local base station sends a connection establishment request. In the CDMA system, a specific Random Access Channel (RACH) is used as an access channel on which the mobile station initiates call establishment, such as by sending a connection establishment request. The local base station responds to the messages of the access channel on Forward Link Paging Channel.

When a traffic channel connection is to be established or when responding to a connection establishment request of the base station, the mobile station sends, via the access channel, a connection establishment message to the base station that forwards it to other parts of the system, typically to a base station controller where traffic channel resources are allocated to the connection. Subsequently, then, the mobile station and base station can communicate over the traffic channel. However, as the mobile station moves through the system, it typically continuously searches, during ongoing communications, for stronger pilot channels of base stations located near the base station, such as to determine whether to hand-off communications from one base station to another.

Also during ongoing communications, the mobile station maintains an active set, a candidate set and a neighbor set of pilot channels for a number of base stations. In this regard, the active set is a set of pilot channels operated by respective base stations that have assigned respective traffic channels to the mobile station. The candidate set is a set of pilot channels that have been received with sufficient strength by the mobile station to be successfully demodulated, but have not been placed in the active set by the base station. The neighbor set, on the other hand, is a set of pilot channels operated by respective base stations that are probable candidates for handoff. Normally, the neighbor set contains pilot channels of base stations that cover geographical areas near the mobile station. Once a pilot channel has been selected into the active set, the traffic channel (including the forward and reverse traffic channels) are capable of conveying digital voice and/or data to and/or from the mobile station, respectively.

In wireless channels, where signals can arrive at different times following different paths, the received signals can experience large amplitude and phase variations due to the interference of the different paths. In this regard, terrestrial wireless signals transmitted from or to a mobile station may be reflected from the terrain, fixed or mobile objects in the propagation path such as buildings or vehicles, or from a discontinuity in the atmosphere. If the energy of the reflected wireless signal is not significantly absorbed and/or attenuated, a plurality of different propagation paths for the wireless signals between the transmitter and receiver, referred to as multipath signals, are created. These different propagation paths, in turn, allow the wireless signals to "bend" around corners and propagate beyond terrain features and objects obstructing the line-of-sight between the base and mobile stations.

In a multipath environment during ongoing communications, non-orthogonal or noise contribution can cause degradation in multipath pilot and traffic channel signals and the resulting output of a rake detector in the CDMA receiver of the mobile station. The multipath pilot channel signal has the greatest likelihood of interfering with the other channels because it represents approximately twenty percent of total transmitted base station power. To reduce interference in such a system, techniques have been developed for suppressing interference caused by the pilot channel signal. More particularly, techniques have been developed for suppressing interference caused by one or more of the active set of pilot channel signals during ongoing communications between the mobile station and one of the active base stations over a respective traffic channel. In this regard, many such techniques suppress interference in the traffic channel of the local base station caused by the multipath local pilot channel signal, and/or interference in the each path of the local pilot channel signal caused by each other path of the local pilot channel signal.

As will be appreciated, when mobile station operates in the idle and access states, the active set of pilot channel signals includes only the pilot channel signal (referred to as the local pilot channel signal) of the local base station. As such, conventional techniques do not attempt to suppress interference from the pilot channels of other base stations since they are not included in the active set. When the mobile station operates in the idle and access states, however, other pilot channels can still interfere with the local pilot channel signal, such as those pilot channels with a signal strength sufficient to be included within the candidate set. Current techniques for suppressing interference, however, are not adapted to suppress interference caused by such pilot channel signals.

SUMMARY OF THE INVENTION

In light of the foregoing background, embodiments of the present invention provide a system and method for canceling interference present in a local channel signal received at a receiver operating in an idle state and/or an access state. The system and method of embodiments of the present invention are capable of canceling the interference caused, for example, by one or more selected interfering pilot channel signals transmitted by base stations other than the local base station, and by multipath components of those pilot channel signals. The channel signal from which such interference is cancelled can be either a local paging channel or the local pilot channel itself. Some embodiments of the present invention can cancel interference from either the paging channel or the pilot channel in accordance with a selector input signal. Although the terms "paging channel" and "pilot channel" are used herein for convenience because it is used in the IS-95 CDMA specification, it should be understood that any analogous mobile communication (e.g., CDMA) system in which like signals are referred to by other names is within the scope of embodiments of the present invention.

According to one aspect of the present invention, a system is provided for reducing interference within a local channel signal received during operation of the system in an idle state and/or an access state. The system includes a controller and a finger demodulator assembly. The controller is capable of selecting at least one interfering pilot channel signal that has a signal strength above a threshold, where the selected interfering pilot signals comprises an interfering set of pilot channel signals. The finger demodulator assembly can then be capable of producing a corrected local channel signal based upon the interfering set of pilot channel signals during the idle state and/or access states. For continuous operation in the idle state and/or access states, the controller can be capable of repeatedly selecting at least one interfering pilot channel signal, while the finger demodulator assembly can be capable of repeatedly producing a corrected local channel. To maintain the interfering set, however, controller can be further capable of repeatedly comparing the selected interfering pilot channel signals to the threshold such that the controller is capable of removing a selected interfering pilot channel signal from the interfering set of pilot channel signals when the signal strength of the respective selected interfering pilot channel signal decreases below the threshold.

More particularly as to the finger demodulator assembly, the finger demodulator assembly can comprise a rake receiver, a cancellation element and a correction element.

The rake receiver includes a first finger assigned to the local channel signal, and a second finger assigned to one of the interfering set of pilot channel signals. The cancellation element, which is associated with the first finger, is capable of producing an interference signal based on a despreading sequence associated with the first finger and a pilot channel pseudonoise (pn) sequence corresponding to the second finger, such as by correlating the despreading sequence with the pilot channel pn sequence. Then, the cancellation element can produce a correction signal corresponding to the first finger based on the interference signal and a received pilot signal corresponding to the second finger, such as by multiplying the interference signal and the received pilot signal. Thereafter, the correction element, which is also associated with the first finger, can subtract the correction signal from the local channel signal to produce a corrected local channel signal.

The cancellation element can further include a cancellation element associated with the second finger, where the cancellation element associated with the second finger includes a digital filter. In this regard, the cancellation element associated with the second finger can be capable of interpolating a value of a pilot channel pseudonoise (pn) sequence corresponding to the second finger to produce a pilot channel pn sequence corresponding to the second finger. Then, the digital filter can digitally filter the pilot channel pn sequence, where the digital filter has an impulse response in accordance with a function equal to the convolution of an input impulse response of an input filter to the receiver and an output impulse response of a transmitter filter of a transmitter transmitting the pilot channel signal of the interfering set of pilot channel signals. In such an instance, the cancellation element associated with the first finger can be capable of producing an interference signal by correlating the despreading sequence with the pilot channel pn sequence after the pilot channel pn sequence has been filtered in the digital filter. Likewise, the cancellation element associated with the first finger can be capable of producing the correction signal by multiplying the interference signal with the received pilot signal corresponding to the second finger.

The rake receiver can also include a third finger assigned to one of the local channel signal and a pilot channel signal from the interfering set of pilot channel signals. In such an instance, the cancellation element can be capable of producing a second interference signal based on the despreading sequence associated with the first finger and a second pilot channel pn sequence corresponding to the third finger. The cancellation element can also be capable of producing a second correction signal corresponding to the first finger based on the second interference signal and a received pilot signal corresponding to the third finger. The correction element, in turn, can be capable of producing the corrected local channel signal by further subtracting the second correction signal from the local channel signal.

Generally, the rake receiver can comprise n fingers, including the first finger and the second finger, where each finger is assigned to one of the local channel signal and a pilot channel signal from the interfering set of pilot channel signals. Then, the cancellation element can be capable of producing n−1 interference signals corresponding to the first finger, each interference signal of the n−1 interference signals based on the despreading sequence associated with the first finger, and one of n−1 pilot channel pn sequences corresponding to the n fingers excluding the first finger. The cancellation element can also be capable of producing n−1 correction signals corresponding to the first finger, each correction signal based on each interference signal of the n−1 interference signals and a received pilot channel signal corresponding to one of n fingers other than the first finger. Further, the correction element can be capable of producing the corrected local channel signal by subtracting the n−1 correction signals from the local channel signal.

More generally, the cancellation element can comprise n cancellation elements, with each cancellation element associated with one of the n fingers. In such instances, each cancellation element for each finger that is assigned to the local channel signal can be capable of producing a group of n−1 interference signals corresponding to each of the n fingers of the rake receiver other than the finger associated with the respective cancellation element. Each cancellation element can also be capable of producing a group of n−1 correction signals corresponding to each of the n fingers of the rake receiver other than the finger associated with the respective cancellation element.

The correction element can likewise comprise n correction elements, with each correction element associated with one of the n fingers. In this regard, each correction element for each finger that is assigned to the local channel signal can be capable of producing a corrected local channel signal for each of the n fingers of the rake receiver other than the finger associated with the respective correction element. Each correction element can then be capable of producing the corrected local channel signal by subtracting the group of n−1 correction signals from the local channel signal assigned to the finger associated with the respective correction element.

Embodiments of the present invention are therefore capable of canceling interference present in a pilot channel signal received at a receiver operating in an idle state and/or an access state. As indicated above, and explained further below, the system and method of embodiments of the present invention are capable of canceling the interference caused, for example, by one or more selected interfering pilot channel signals created by base stations other than the local base station, and by multipath components of the pilot channel signal. In this regard, the system and method of embodiments of the present invention are capable of canceling interference in the idle state and/or access state, where conventional cancellation techniques typically cancel interference from an active set of pilot channels when the mobile station operates in a traffic state. Therefore, the systems and methods of embodiments of the present invention provide additional advantages over conventional systems and methods of canceling interference.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
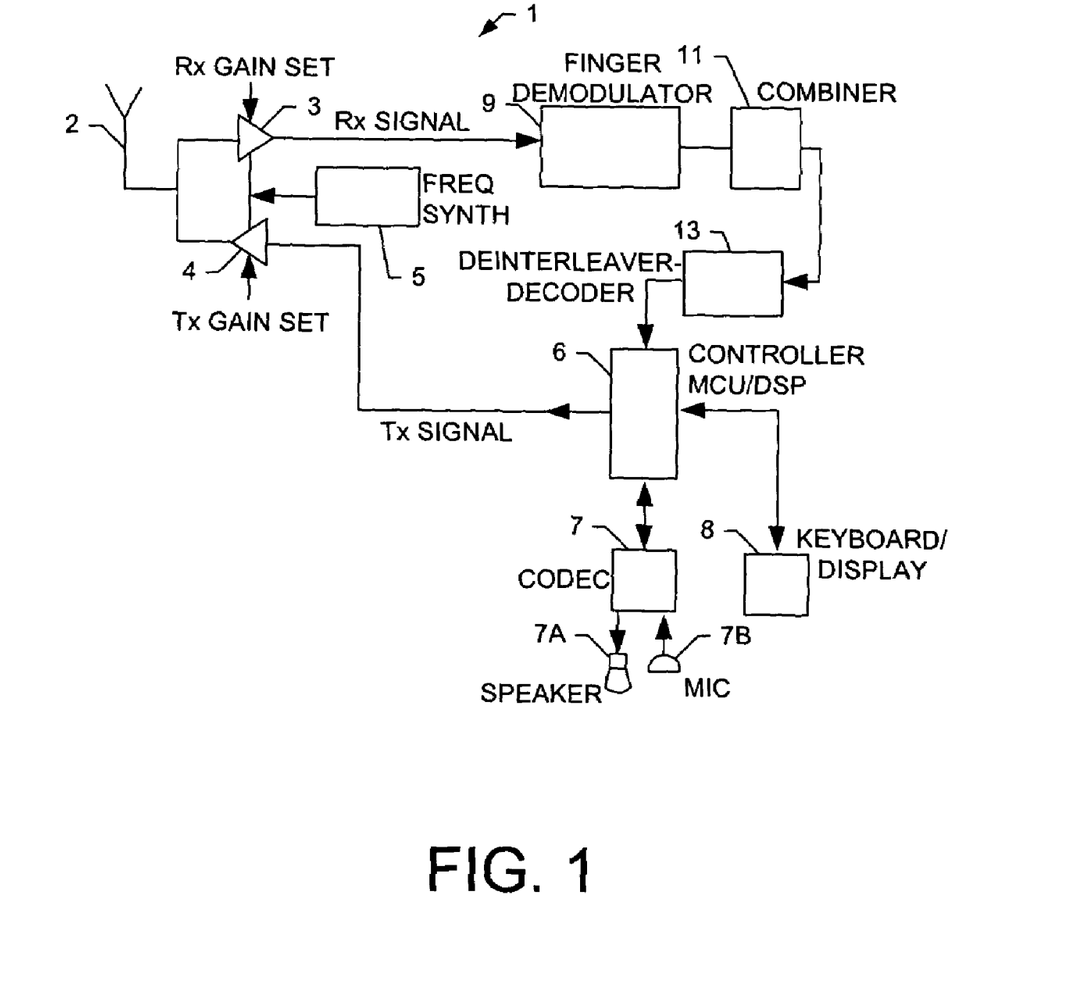
FIG. 1 is a block diagram of a portion of a CDMA mobile station that would benefit from the system and method of embodiments of the present invention.

Referring to FIG. 1, there is illustrated an embodiment of a spread spectrum CDMA mobile station 1 that is suitable for practicing embodiments of the present invention. Certain blocks of the mobile station may be implemented with discrete circuit elements, or as software routines that are executed by a suitable digital data processor, such as a high speed signal processor. Alternatively, a combination of circuit elements and software routines can be employed. As such, the ensuing description is not intended to limit the application of this invention to any one particular technical embodiment.

In one embodiment of the present invention, the spread spectrum CDMA mobile station 1 operates in accordance with the TIA/EIA Standard, CDMA Mobile Station–Base Station Compatibility Standard for Dual-Mode Wideband Spread Spectrum Cellular System, TIA/EIA/IS-95, as modified if required by the teachings of this invention. However, compatibility with this particular standard is not to be considered a limitation upon the practice of this invention. The CDMA mobile station 1 includes an antenna 2 for receiving RF signals from a base station (not shown), and for transmitting RF signals to the base station. When operating in the digital (spread spectrum or CDMA) mode the RF signals are phase modulated to convey speech and signaling information. Coupled to the antenna are a gain controlled receiver 3 and a gain controlled transmitter 4 for receiving and for transmitting, respectively, the phase modulated RF signals. A frequency synthesizer 5 provides the required frequencies to the receiver and transmitter under the control of a controller 6. The controller is comprised of a slower speed MCU (microcontroller unit) for interfacing, via a codec 7, to a speaker 7A and a microphone 7B, and also to a keyboard and a display 8. In general, the MCU is responsible for the overall control and operation of the CDMA mobile station. The controller is also preferably comprised of a higher speed digital signal processor (DSP) suitable for real-time processing of received and transmitted signals.

The received RF signals are converted to base band in the receiver and are applied to a phase demodulator (not shown) which derives a complex signal from the received signal. The complex signal is converted to digital representations by suitable A/D converters and applied to a finger demodulator assembly 9, as described below. The output of the finger demodulator assembly is applied to a combiner 11 that outputs a signal, via a deinterleaver and decoder 13, to the controller 6. The digital signal input to the controller is expressive of, for example, speech samples or signaling information. The further processing of this signal by the controller is not germane to an understanding of embodiments of the present invention, and is not further described, except to note that the signaling information typically includes commands and information regarding pilot channels.

Figure 2:
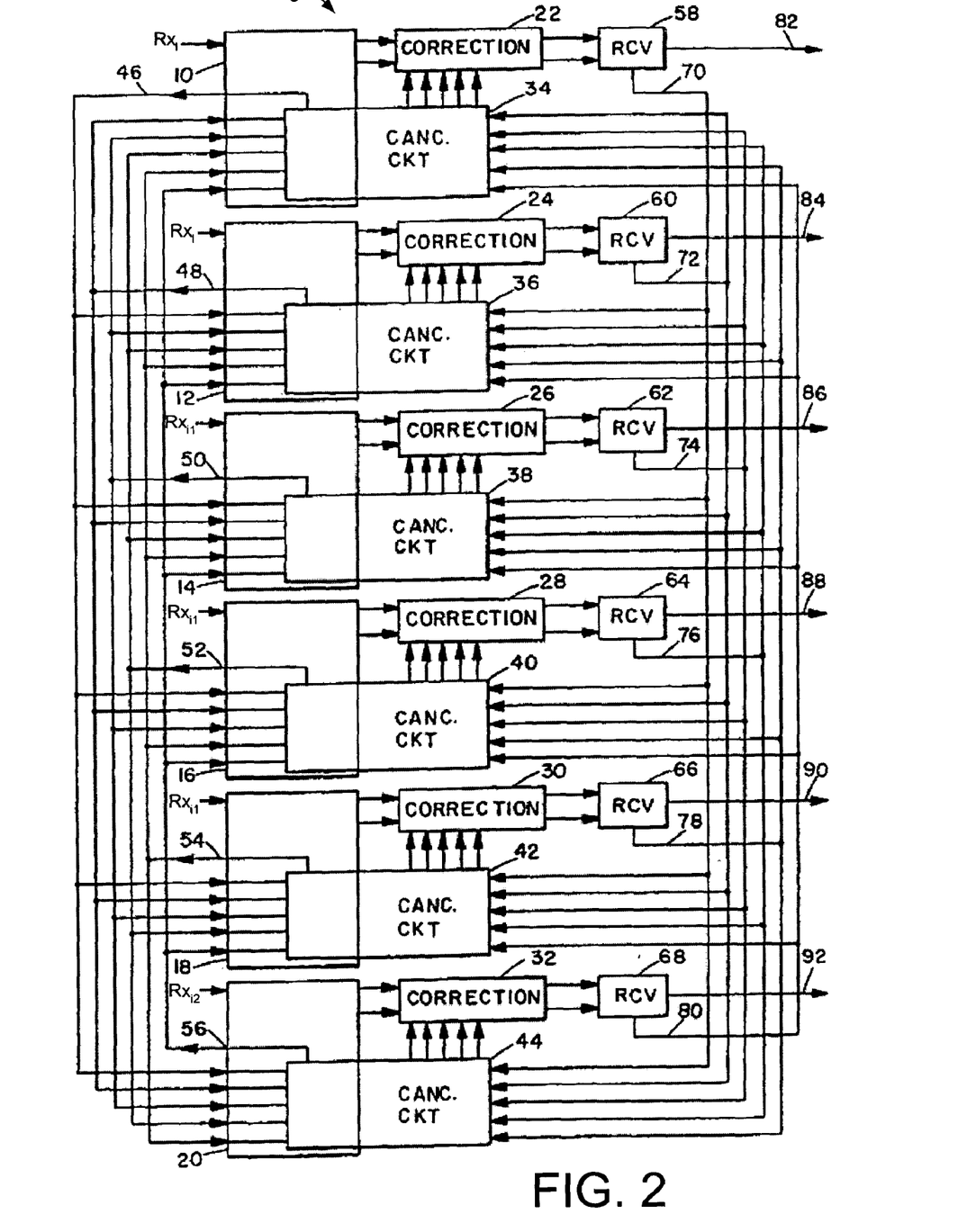
FIG. 2 is a block diagram of a portion of the receiver of the mobile station of FIG. 1 that includes a system for canceling interference in the pilot channel signal caused by multipath reception of the pilot channel signal and selected interfering pilot channel signals when the mobile station operates in an idle state and/or an access state.

Referring now to FIG. 2, the finger demodulator assembly 9 includes a six-finger Rake detector element (not shown in its entirety), including six corresponding finger elements or circuits 10, 12, 14, 16, 18 and 20. Although the illustrated rake receiver uses six fingers, essentially any suitable number (n) of fingers could be used. For example, the IS-95 CDMA standard describes the use of three fingers. As explained in the background section above, when the mobile station 1 operates in an idle state and/or an access state before a traffic channel between the mobile station and a local base station is established, the active set of pilot channels includes only the pilot channel signal (referred to as the local pilot channel signal) of the local base station. In accordance with embodiments of the present invention, when the mobile station operates in the idle and/or access states, one or more fingers can receive a local complex baseband transmitted signal ("Rx") from the local base station and demodulate or despread each path of the local multipath signal into a local pilot channel signal and a local paging channel signal. For example, the local multipath signal can comprise a dual path signal, with the first finger circuit 10 demodulating or despreading the first path and the second finger circuit 12 demodulating or despreading the second path.

In accordance with embodiments of the present invention, when the mobile station 1 operates in the idle and/or access states, the controller 6 can assign one or more finger circuits 10, 12, 14, 16, 18 and 20 to the local multipath signal Rx, and assign one or more of the remaining finger circuits to selected interfering multipath signals, as described below. As will be appreciated, the interfering multipath signals can be selected in any of a number of different manners. For example, in one embodiment, the controller of the mobile station can select the interfering multipath signals by tracking the pilot channel signal strength of a number of multipath signals transmitted by base stations other than the local base station, such as in a conventional manner by tracking the ratio of the energy of a number of received pilot channel signals to overall received energy. Also in a conventional manner, the controller can compare the signal strengths of the pilot channel signals to a threshold. The threshold can comprise any of a number of different threshold interference levels tolerable by the mobile station, but in one embodiment, the threshold comprises T_ADD, as such is defined by IS-95. Then, the controller can select those multipath signals with a pilot channel signal strength above T_ADD as the interfering multipath signals, with the exception of the local multipath signal.

After selecting the interfering multipath signals, the controller 6 can assign one or more of the finger circuits 10, 12, 14, 16, 18 and 20 not already assigned to the local multipath signal to the selected interfering multipath signals. The controller can assign the finger circuits not already assigned to the local multipath signal to the selected interfering multipath signals in any of a number of different conventional manners, including any of the number of different manners the controller assigns one or more fingers to the local multipath signal. In this regard, as before, each remaining finger circuit can be assigned to a path of a given selected interfering multipath signal. More particularly, when the number of paths of the selected interfering multipath signals is less than or equal to the number of remaining fingers, each finger can be assigned to a path of a given selected interfering multipath signal.

When the number of paths of the selected interfering multipath signals exceed the number of remaining fingers, however, the remaining fingers can be assigned to the paths of the selected interfering multipath signals in any of a number of different manners. In one embodiment where r finger circuits remain unassigned after assigning the local multipath signal, for example, the strongest r paths of the selected interfering multipath signals can be assigned to the remaining fingers. For example, presume that three finger circuits remain after assigning the local multipath signal to the first and second finger circuits, and presume the controller selects two interfering multipath signals, a first interfering multipath signal having three paths $Rx_{i1a}$, $Rx_{i1b}$ and $Rx_{i1c}$, and a second interfering multipath signal having two paths $Rx_{i2a}$ and $Rx_{i2b}$. Also, presume that the relative signal strengths among the paths of the selected interfering multipath signal can be shown as follows: $Rx_{i1a}$>$Rx_{i2b}$>$Rx_{i1c}$>$Rx_{i1a}$>$Rx_{i2a}$. In such an instance, the third, fourth and fifth finger circuits 14, 16 and 18 can be assigned to paths $Rx_{i1a}$, $Rx_{i2b}$ and $Rx_{i1c}$, while the sixth finger circuit 20 can be assigned to path $Rx_{i1a}$ (with path $Rx_{i2a}$ also being assigned when the rake receiver includes seven finger circuits—i.e., n=7).

Reference will now be made to the illustrated example where the first two finger circuits 10 and 12 are assigned to the local multipath signal, and the third, fourth, fifth and sixth finger circuits 14, 16, 18 and 20 are each assigned to a path of two selected interfering multipath signals. As shown in FIG. 2, the first and second finger circuits can receive the local complex baseband transmitted signal ($Rx_1$) and demodulate or despread the local multipath signal into a local pilot channel signal $f1_p(k)$ and a paging channel signal $f1_{pg}(k)$. Additionally, the third, fourth and fifth finger circuits can receive and demodulate or despread the three paths of the first selected interfering multipath signal ($Rx_{i1}$), while the sixth finger circuit receives and demodulates or despreads the strongest path of the second selected interfering multipath signal ($Rx_{i2}$).

The local pilot channel signal of the local multipath signal can be expressed as:

$$f1_p(k) = \sum_{i=o}^{63} x'_r(zTs)c'(z)' \tag{1}$$

$$= A_{1p}(k) + B_{1p}(k) + C_{1p}(k) \tag{2}$$

where $x_r'(t)$ represents the received and filtered signal, $z=(64k+i)$, the chip rate $1/T_s=1.2288*10^6$ s, $c'(n)$ represents the pseudonoise (pn) code generated locally at the receiver, $A_{1p}(k)$ represents the desired complex data, $B_{1p}(k)$ represents the interference caused by the selected interfering multipath pilot channel signals and the multipath local pilot channel signal, and $C_{1p}(k)$ represents other interference not corrected by embodiments of the present invention. Note that the equations are based upon an exemplary system in which the symbol rate is 64 chips per symbol and the waveform corresponds to IS-95 modulation. Also note that although the equations assume the existence of two multipath signals (i.e., $A_{1p}(k)$ and $B_{1p}(k)$), they are readily extended to any number. The data portion of the signal can be expressed as:

$$A_{1p}(k) = 128b(k)\sqrt{E_{cp}}\, g_1(k)e^{j\Theta_1(k)} \tag{3}$$

$$B_{1p}(k) = \sqrt{E_{cip}}\, g_2(k)e^{j\Theta_2(k)} \tag{4}$$

$$\sum_{i=0}^{63} \{c(z - \lfloor \tau/T_s \rfloor)c'(z)' * (h(zT_s - \lfloor \tau/T_s \rfloor)) * (h'(z))\}$$

where b(k) represents the data symbols, $E_{cp}$ represents energy per chip for the local pilot channel signal, $E_{cip}$ represents the sum of the energy per chip for the interference caused by the selected interfering pilot channel signals and the multipath local pilot channel signal, τ represents the path delay, g represents the multipath signal gain, $e^{j\theta(k)}$ represents the multipath signal phase, h represents the transmitter output filter, and h' represents the receiver input filter (note assumptions that: c'(z)=c(z), i.e., receiver pn code aligned with transmitted pn code; and $h(zT_s)*h'(z)=1$, i.e., perfectly matched filters). The local paging channel signal can be expressed similarly, the only difference being the addition of a $W_n'(z)$ representing a Walsh code generated locally at the receiver. Although the corresponding local paging channel signal equations are omitted for this reason, the description herein of noise cancellation in the local pilot channel signal applies to noise cancellation in the paging channel signal as well.

Each of the paging channel signals, and local and selected interfering pilot channel signals that is despread by a respective finger circuit 10, 12, 14, 16, 18 and 20 can be provided to an associated corresponding correction element or circuit 22, 24, 26, 28, 30 and 32. For each path of the local pilot channel signal, the correction circuit can cancel or subtract out the interference caused by the selected interfering pilot channel signals as well as each other path of the multipath local pilot channel signal itself, as described below in further detail. On the other hand, while the correction circuit may perform similar operations on each path of the selected interfering multipath signals, any interference cancelled or subtracted out of such signals is typically discarded or otherwise unutilized by the system.

The term $B_{1p}(k)$ set forth in Equation 4, which represents the interference caused by selected interfering pilot channel signals and the multipath local pilot channel signal, is the quantity that is subtracted out. Six cancellation elements or circuits 34, 36, 38, 40, 42 and 44, one corresponding to each finger, can produce this interference term $B_{1p}(k)$. The interference term can be readily determined because the multipath amplitude and phase of the local and selected interfering pilot channel signals, the cross-correlations of the interfering pseudonoise (pn) sequences and locally generated pn sequences, and the convolution of the transmitter pulse-shaping filter and receiver filter are all known or predetermined, i.e., they can be estimated empirically from received data. Each of cancellation circuits 34, 36, 38, 40, 42 and 44 can produce five correction signals to be subtracted out.

Correction circuits 22, 24, 26, 28, 30 and 32 can provide corrected and uncorrected local and selected interfering pilot channel signals, as well as corrected and uncorrected local paging channel signal and paging channel signals of the selected interfering multipath signals, to the remaining receiver elements or circuitry 58, 60, 62, 64, 66 and 68, respectively. Circuitry 58, 60, 62, 64, 66 and 68 are described in further detail below, and perform some functions to produce the received local or selected interfering pilot channel signals 70, 72, 74, 76, 78 and 80 and received local paging channel signals 82, 84, 86, 88, 90 and 92. Each of circuitry 58, 60, 62, 64, 66 and 68 provides its received local or selected interfering pilot channel signal to the cancellation circuits of the other five fingers. The received local paging channel signals can then be combined in the combiner 11 in the conventional manner, with the paging channel signals of the selected interfering multipath signals being discarded via a multiplexer 136, for example.

As described more fully below, in response to their local or selected interfering pilot channel pn sequences, finger circuits 10, 12, 14, 16, 18 and 20 can produce signals 46, 48, 50, 52, 54 and 56, respectively, each of which can be provided to the other finger circuits. The system can include a means (not shown in FIG. 2 for purposes of clarity) for selecting whether the pilot channel multipath noise (from the local and selected interfering pilot channel signals) that is present in the local paging channel signal or the local pilot channel signal is canceled. In either event, each of cancellation circuits 34, 36, 38, 40, 42 and 44 can produce each of the correction signals in response to the pn sequence of the local or selected interfering pilot channel signal assigned to the respective finger circuit, the local or selected interfering pilot channel pn sequence corresponding to one of the other fingers, and the received local or selected interfering pilot channel signal corresponding to that other finger. For example, presume that the first and second finger circuits 10 and 12 are assigned to the local pilot channel signal and the remaining third, fourth, fifth and sixth finger circuits 14, 16, 18 and 20 are assigned to selected interfering pilot channel signals. In such an instance, cancellation circuit 34 (which corresponds to the first finger) can produce the first of its five correction signals in response to the pn sequence of the local pilot channel signal assigned to the first finger, the local pilot channel pn sequence 48 corresponding to the second finger, and the received local pilot channel signal 72 corresponding to the second finger; produce the second correction signal in response to the pn sequence of the local pilot channel assigned to the first finger, the selected interfering pilot channel pn sequence 50 corresponding to the third finger, and the received selected interfering pilot channel signal 74 corresponding to the third finger; produce the third correction signal in response to the pn sequence of the local pilot channel assigned to the first finger, the selected interfering pilot channel pn sequence 52 corresponding to the fourth finger, and the received selected interfering pilot channel signal 76 corresponding to the fourth finger; produce the fourth correction signal in response to the pn sequence of the local pilot channel assigned to the first finger, the selected interfering pilot channel pn sequence 54 corresponding to the fifth finger, and the received selected interfering pilot channel signal 78 corresponding to the fifth finger; and produce the fifth correction signal in response to the pn sequence of the local pilot channel assigned to the first finger, the selected interfering pilot channel pn sequence 56 corresponding to the sixth finger, and the received selected interfering pilot channel signal 80 corresponding to the sixth finger. Similarly, for example, cancellation circuit 36 (which corresponds to the second finger) can produce the first of its five correction signals in response to the pn sequence of the local pilot channel assigned to the second finger, the local pilot channel pn sequence 46 corresponding to the first finger, and the received local pilot channel signal 70 corresponding to the first finger; produce the second correction signal in response to the pn sequence of the local pilot channel assigned to the second finger, the selected interfering pilot channel pn sequence 50 corresponding to the third finger, and the received selected interfering pilot channel signal 74 corresponding to the third finger; produce the third correction signal in response to the pn sequence of the local pilot channel assigned to the second finger, the selected interfering pilot channel pn sequence 52 corresponding to the fourth finger, and the received selected interfering pilot channel signal 76 corresponding to the fourth finger; produce the fourth correction signal in response to the pn sequence of the local pilot channel assigned to the second finger, the selected interfering pilot channel pn sequence 54 corresponding to the fifth finger, and the received selected interfering pilot channel signal 78 corresponding to the fifth finger; and produce the fifth correction signal in response to the pn sequence of the local pilot channel assigned to the second finger, the selected interfering pilot channel pn sequence 56 corresponding to the sixth finger, and the received selected interfering pilot channel signal 80 corresponding to the sixth finger. The third, fourth, fifth and sixth fingers are configured in the same manner.

Figure 3:
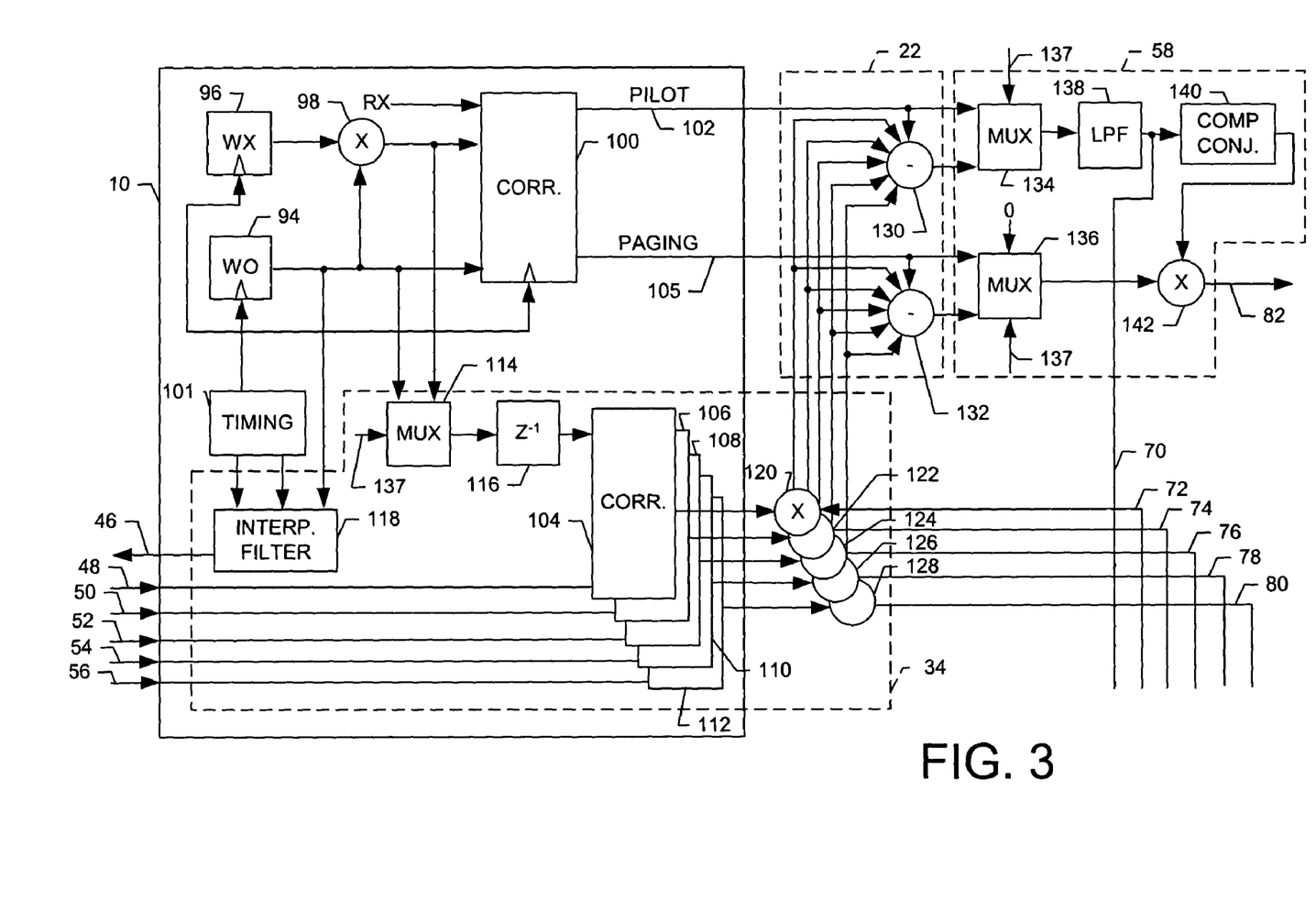
FIG. 3 is a block diagram of the elements of the system that correspond to one finger of a six-finger Rake detector in the receiver of one embodiment of the present invention.

The elements of the system corresponding to the first finger are illustrated in further detail in FIG. 3. The other five fingers are not described or illustrated in similar detail because they are essentially the same as the first finger. First finger circuit 10 includes, among other elements, a pn sequence generator (WO) 94, a Walsh code generator (WX) 96, a multiplier 98 and a correlator 100. Sequence generator 94 can provide a pn sequence representing the assigned local or selected interfering pilot channel (Walsh channel zero) to correlator 100. Multiplier 98, in turn, can multiply the locally generated pn sequence by a Walsh code defining the paging channel of the respective local or selected interfering multipath signal, and provide the resulting pn sequence to correlator 100. Timing circuitry 101 can control the operation of these elements, such as at the chip rate of 1.2288 MHZ. Correlator 100 can also receive the baseband received signal Rx (e.g., $Rx_1$, $Rx_{i1}$ or $Rx_{i2}$). In response to these signals, correlator 100 can produce a despread local or selected interfering pilot channel signal 102 and paging channel signal 105 of the local or selected interfering multipath signal, such as in the conventional manner.

Cancellation circuit 34 can include five cancellation correlators 104, 106, 108, 110 and 112, with each performing the convolution operation indicated in Equation 4 above over an exemplary interval of 64 chips per symbol. The term c'(z)' in Equation 4 can be defined by the assigned local or selected interfering pilot channel signal that is provided to cancellation correlators 104, 106, 108, 110 and 112. Whether the system cancels interference in the local pilot channel signal 102 or local paging channel signal 105 can be determined by a multiplexer 114. In response to a selection signal 137, multiplexer 114 can provide to correlators 104, 106, 108, 110 and 112 either the assigned local or selected interfering pilot channel pn sequence, or the Walsh-encoded pn sequence from the assigned local paging channel signal or paging channel signal from a respective selected interfering multipath signal, via a delay element 116. As persons of skill in the art understand, such delay elements can be included in any suitable signal paths in the system to ensure that the correction signals are applied in proper synchronism or alignment with the signals to be corrected. The selection signal can be generated in any suitable manner, and is preferably maintained in a constant state during operation.

The other terms involved in the convolution operation in Equation 4 can be defined by the remaining inputs to cancellation correlators 104, 106, 108, 110 and 112. The term $(h(zT_s-\lfloor \tau/T_s \rfloor))*(h'(z))$ represents the convolution of the transmitter and receiver filters (not shown). A digital interpolation filter 118 can provide this function because it has an impulse response that approximates the convolution of the transmitter and the receiver filters. In this regard, interpolation filter 118 can operate in response to the assigned local or selected interfering pilot channel pn sequence signal, the chip rate clock signal it receives from timing circuitry 101 and a faster clock signal (e.g., 9.8304 MHZ) it also receives from timing circuitry 101. The interpolation aspect refers to the interpolation of the assigned local or selected interfering pilot channel pn sequence, typically from 1.2288 MHZ to 9.8304 MHZ. Interpolation filter 118 can, for example, sample the assigned local or selected interfering pilot channel pn sequence signal at the 9.8304 MHZ rate and apply suitable interpolation algorithm. From the equations and other description provided above, persons of skill in the art will readily be capable of designing a suitable interpolation filter 118 or other means for performing the interpolation. As such persons will appreciate, selection of the filter coefficients can depend upon the transmitter and receiver filters, the clocking rates and other factors.

Each of cancellation correlators 104, 106, 108, 110 and 112 can produce an interference signal that is provided to one of five multipliers 120, 122, 124, 126 and 128. The correction signals $B_{1p}(k)$ can then be produced by multiplying the interference signals by the received local and selected interfering pilot channel signals, which represent the multipath phase and gain term in Equation 4. Next, a subtractor 130 can subtract all five correction signals from the assigned local or selected interfering pilot channel signal 102 to form a corrected local or selected interfering pilot channel signal. Subtraction of the $B_{1p}(k)$ term from Equation 2 leaves only the desired pilot channel signal term $A_{1p}(k)$ and the "other interference" term $C_{1p}(k)$ in the received pilot channel signal.

For fingers assigned to the local pilot and paging channel signals, a multiplexer 134, operating in response to selection signal 137, can select either the corrected local pilot channel signal or the uncorrected local pilot channel signal. Similarly, for fingers assigned to the local pilot and paging channel signals, another multiplexer 136, also operating in response to the selection signal (or to a similar selection signal), can select either the corrected local paging channel signal or the uncorrected local paging channel signal. For fingers assigned to selected interfering multipath signals, on the other hand, multiplexer 134 typically selects the uncorrected pilot channel signal because the fingers assigned to the selected interfering pilot channel signals do not process the respective interfering pilot channel signals for receipt by the controller 6. Also for fingers assigned to selected interfering multipath signals, multiplexer 136 typically discards the paging channel signal, such as by passing a null "0" value.

The remaining elements or circuitry can be conventional in a CDMA receiver and can include a low-pass filter 138 for filtering the corrected local pilot channel signal or the uncorrected selected interfering pilot channel signal to produce a received local pilot channel signal or received selected interfering pilot channel, respectively. The remaining circuitry can also include a complex conjugate circuit 140 and multiplier 142 for removing the phase error from the received local paging channel signal. Note that received local or selected interfering pilot channel signal 70 is preferably taken following low-pass filter 138.

From the foregoing, it can be seen that a plurality of noise reduction elements or circuits can be formed where each noise reduction circuit includes at least one digital filter (interpolator) 118, at least one correlator 104, a multiplier 120, and a subtractor 130. As shown in FIG. 3, the digital filter 118 in cancellation circuit 34 can provide an interpolated local or selected interfering pilot channel pn sequence to each of the other cancellation circuits 36-44.

Therefore, in an embodiment of the invention, an interference signal can be produced for each of the assigned local and selected interfering pilot channel pn sequences by correlating the despreading sequence for the particular finger 10 of the receiver with the assigned local or selected interfering pilot channel pn sequences 48-56 from the other fingers 12-20 in a plurality of correlators 104-112. The resulting interference signals can then be multiplied by their corresponding received local or selected interfering pilot channel signal in the plurality of multipliers 120-128 to produce the correction signals. As explained above, the correction signals can be subtracted from the local pilot channel signal to reduce the noise level of the local pilot channel signal. As such, the detrimental effects of interference created by the selected interfering pilot channel signals and the multipath local pilot channel signal can be cancelled or reduced during idle and/or access state operation prior to the establishment of a traffic channel with the local base station. Those skilled in the art will recognize that various configurations can be formed either in hardware or software to perform the described functions.

As described above the local pilot channel signal typically comprises a multipath signal, where each path can cause interference to each other path. As such, as also described above, embodiments of the present invention are capable of suppressing interference in the local pilot channel signal caused by the selected interfering pilot channel signals and the multipath local pilot channel itself. For example, again consider the example where the first and second finger circuits 10 and 12 are assigned to a respective path of a dual path local pilot channel signal, while the third, fourth, fifth and sixth finger circuits 14, 16, 18 and 20 are assigned to multipath selected interfering pilot channel signals. In such an instance, interference caused by the multipath selected interfering pilot channel signals can be cancelled from each path of the local pilot channel signal assigned to the first and second finger circuits. In addition, interference caused by the path of the local pilot channel signal assigned to the second finger circuit can also be cancelled from the path of the local pilot channel signal assigned to the first finger circuit. Further, interference caused by the path of the local pilot channel signal assigned to the first finger circuit can also be cancelled from the path of the local pilot channel signal assigned to the second finger circuit.

Figure 4A:
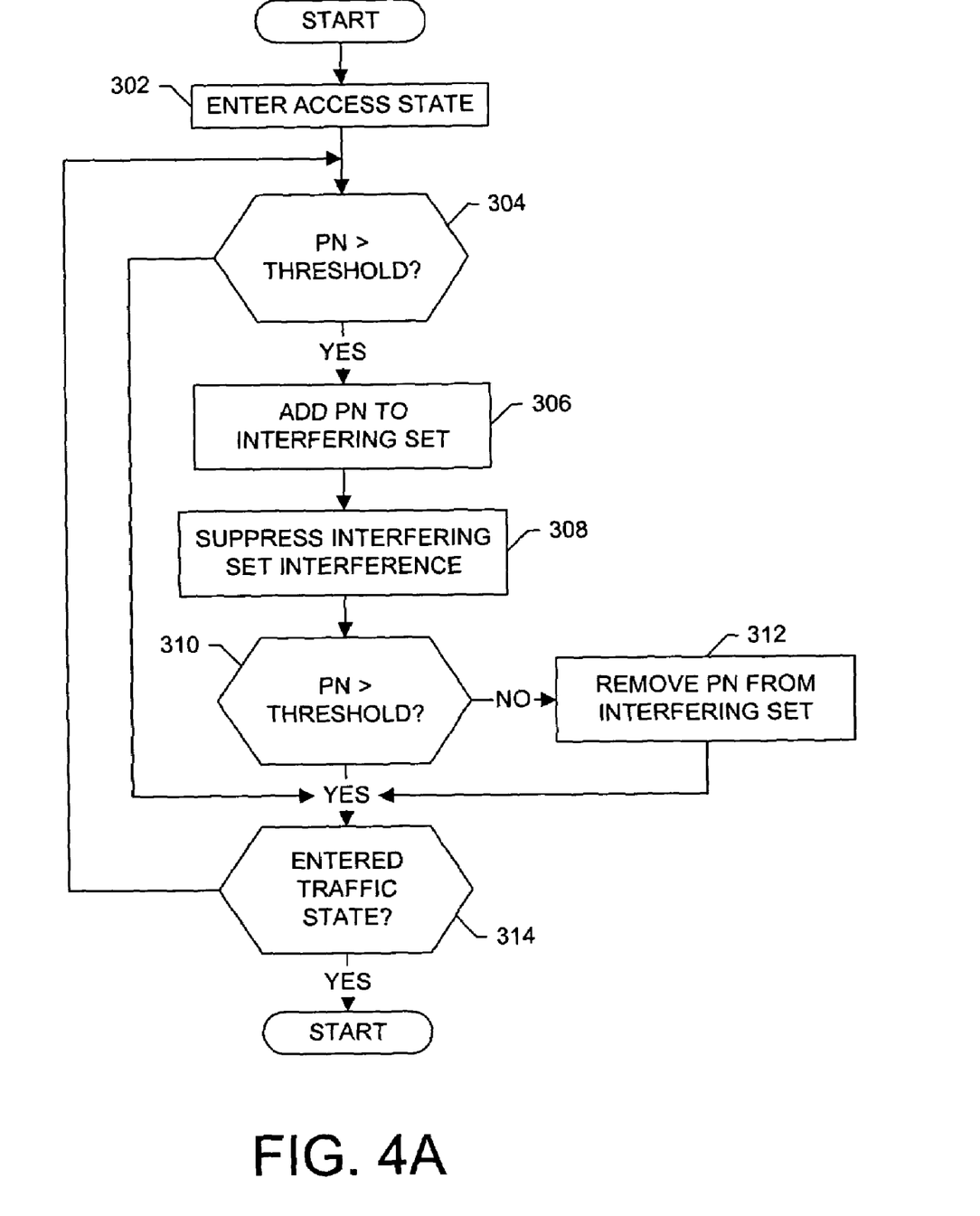
FIGS. 4A and 4B are flow charts of a method of reducing noise in a pilot channel signal in accordance with an embodiment of the invention.
Figure 4B:
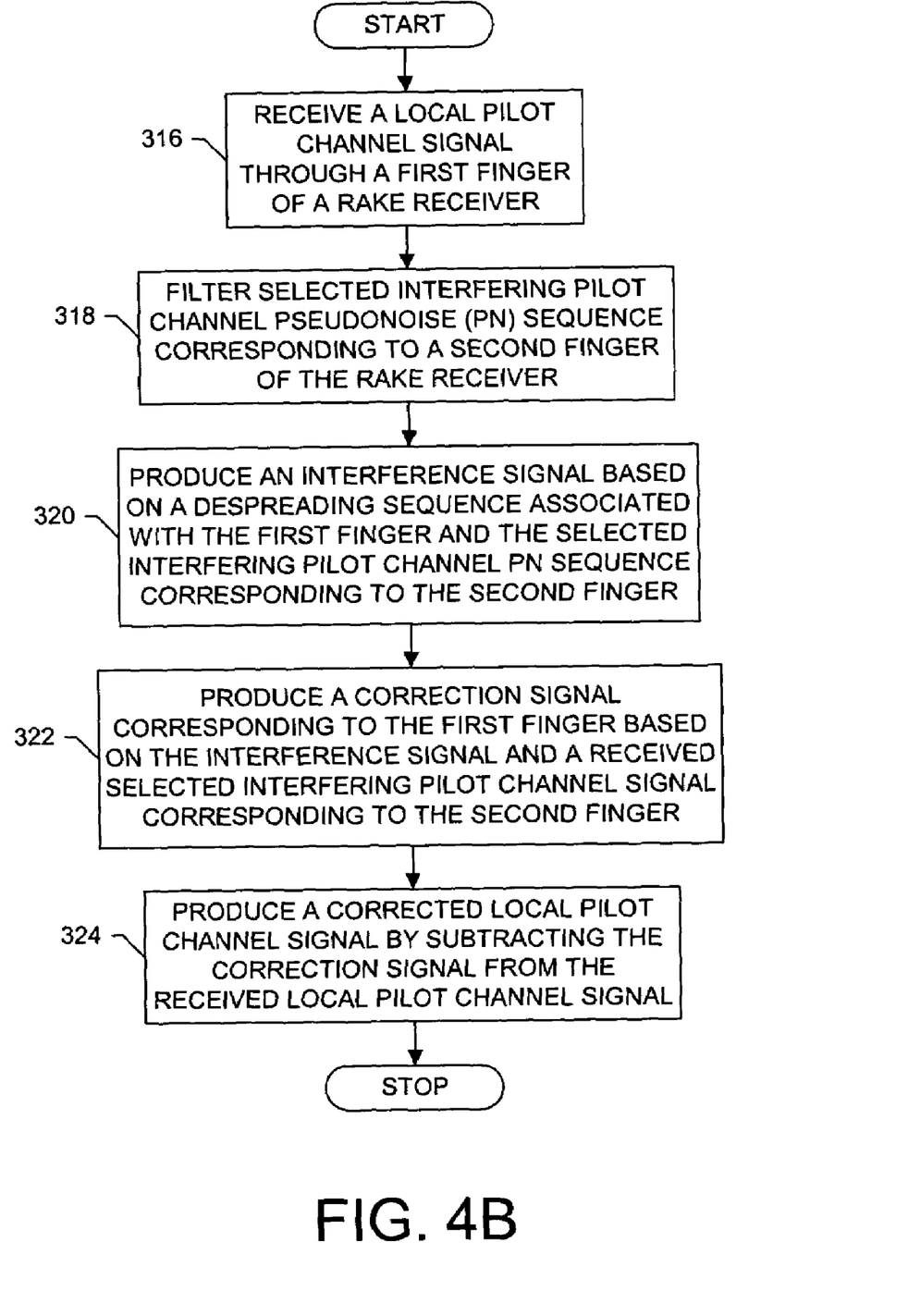

FIGS. 4A and 4B are flow charts of a method of reducing noise in a local pilot channel signal in accordance with an embodiment of the invention. The method can be performed using various hardware and software and may be implemented with a digital signal processor, controller, digital processor or any other type of signal processor or combination of processors. As described below, the first finger is assigned to the local pilot channel signal, while one or more of the remainder of the fingers are assigned to one or more selected interfering pilot channel signals. It should be understood, however, that one or more fingers can be assigned to the local pilot channel signal, and that the first finger need not be the finger assigned to the local pilot channel signal. Likewise, it should be understood that one or more fingers can be assigned to one or more selected interfering pilot channel signals, and that the first finger can be assigned to a selected interfering pilot channel signal. Further, as described below, the mobile station 1 operates by entering and thereafter operating in the access state. It should be understood, however, that embodiments of the present invention are equally applicable to the mobile station entering and operating in the idle state, in addition to or in lieu of, operating in the access state.

Generally, the method begins with the mobile station 1 entering the access state by attempting to establish a connection with a local base station, as shown at step 302. As the mobile station enters the access state, one or more fingers 10, 12, 14, 16, 18 and 20 are assigned to the local multipath signal of the local base station. After entering the access state, the controller 6 of the mobile station can create an interfering set of pilot channel signals, where the interfering set of pilot channel signals comprises selected interfering pilot channel signals from selected interfering multipath signals. More particularly, the controller can track the pilot channel signal strength of a number of multipath signals generated by respective base stations, such as by tracking the ratio of the energy of a number of received pilot channel signals to overall received energy. As the controller tracks the pilot channel signal strength of the pilot channel signals, the controller can compare the signal strengths of the pilot channel signals to a threshold, T_ADD, as shown at step 304. For each pilot channel signal of a multipath signal that has a strength above a threshold, the controller can select the interfering pilot channel signal (with the exception of the local pilot channel signal) and add the selected interfering pilot channel signal to the interfering set, as shown at step 306. The mobile station can then proceed to suppress the interference caused by the interfering set, and if so desired, multipath local pilot channel signal interference, from the local pilot channel signal, as shown at step 308.

Reference is now made to FIG. 4B, which more particularly illustrates various steps in a method for suppressing the interference. At step 316, a local pilot channel signal is received at a first finger 10 of a rake receiver assigned to receive the local pilot channel signal. The received local pilot channel signal can be received using any of a number of known methods of receiving a data signal, such as any known method for receiving a data signal in CDMA systems, using a correlator 100. Then, at step 318, the pilot channel pseudonoise sequence corresponding to a second finger (12-20) assigned to either another path of the local multipath pilot channel signal or the interfering set of pilot channel signals (i.e., a respective path of one or more selected multipath interference pilot channel signals) is filtered. As described above, the digital interpolator filer 118 has a response based on the input filter of the receiver and the output filter of the transmitter, and can interpolate the pilot channel pseudonoise sequence between chip periods to produce an interpolated pilot channel pseudonoise sequence.

At step 320, an interference signal is produced based on the despreading sequence associated with the second finger and the local pilot channel pseudonoise sequence. In one embodiment, the interpolated pilot channel pseudonoise sequence is correlated with the despreading sequence in a correlator 104. Next, at step 322, a correction signal corresponding to the first finger is produced based on the interference signal and the received local or interfering set pilot channel signal corresponding to the second finger. In one embodiment, the correction signal is produced by multiplying the interference signal with the received local or interfering set pilot channel signal.

At step 324, a corrected local pilot channel signal is produced by subtracting the correction signal from the received local pilot channel signal. As described above, the receiver includes a plurality of rake receiver fingers and the corrected local pilot channel signal can be produced by subtracting a plurality of correction signals where each signal is based on an interference signal associated with a finger of the rake receiver other than the finger that is receiving the local pilot channel signal of interest. Therefore, if there are n fingers in the rake receiver, the n−1 interference signals can be produced by correlating the appropriate sequence of the n−1 local or interfering set pilot channel pn sequences with the corresponding despreading sequence associated with the local pilot channel pn sequence (step 320). The resulting n−1 interference signals are multiplied by the appropriate received local or interfering set pilot channel signal to produce the n−1 correction signals (step 322). The n−1 correction signal are subtracted from the received local pilot channel signal at step 324.

Again referring to FIG. 4A, as the mobile station 1 suppresses the interference of the interfering set (and possibly the multipath local pilot channel signal), the controller 6 can continue to track the pilot channel signal strength of a number of multipath signals (at step 304), and can track the pilot channel signal strength of the pilot channel signals in the interfering set. As the controller tracks the pilot channel signals strength of the pilot 30 channel signals in the interfering set, the controller can compare the signal strengths of the interfering set to the threshold, T_ADD, as shown at step 310. Then, for each pilot channel signal in the interfering set that has a signal strength drop below T_ADD, the controller can remove the respective pilot channel signal from the interfering set, as shown at step 312. The controller can continue to operate in a similar fashion, by maintaining the interfering set and suppressing interference caused by the interfering set (and possibly the multipath local pilot channel signal). In this regard, the controller can continue to operate in accordance with steps 302-312 until the mobile station ceases to operate in the access state and enters a traffic state whereby the mobile station communicates with the local base station over an assigned traffic channel, as shown at step 314. Then, when the mobile station enters the traffic state, the controller can, if so desired, clear the interfering set.

As indicated above, embodiments of the present invention are capable of suppressing interference caused by interfering multipath signals and an interfering local multipath pilot channel signal as the mobile station 1 operates in an idle state and/or an access state. It will be appreciated, then, that embodiments of the present invention can be utilized with techniques adapted to suppress interference as the mobile station operates in the traffic state. For an example of one such technique that could be utilized with embodiments of the present invention to suppress interference in the traffic state, see U.S. Pat. No. 6,570,909 entitled: Interference Suppression in a CDMA Receiver, issued May 27, 2003, the contents of which are hereby incorporated by reference in its entirety.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of reducing interference within a local channel signal received during operation of a mobile station in at least one of an idle state or an access state, the method comprising:
   selecting at least one interfering pilot channel signal that has a signal strength above a threshold, wherein the selected at least one interfering pilot channel signal constitutes an interfering set of pilot channel signals; and
   producing a corrected local channel signal based upon the interfering set of pilot channel signals during the at least one of the idle state or the access state.

2. A method according to claim 1, wherein selecting at least one interfering pilot channel signal and producing a corrected local channel signal comprise repeatedly selecting at least one interfering pilot channel signal and repeatedly producing a corrected local channel, respectively, and wherein the method further comprises:
   repeatedly comparing the selected interfering pilot channel signals to the threshold, and removing a selected interfering pilot channel signal from the interfering set of pilot channel signals when the signal strength of the respective selected interfering pilot channel signal decreases below the threshold.

3. A method according to claim 1, wherein the local channel signal is received in a receiver including a rake receiver having at least a first finger assigned to the local channel signal and a second finger assigned to one of the interfering set of pilot channel signals, and wherein producing a corrected local channel signal comprises:
   producing an interference signal based on a despreading sequence associated with the first finger, and a pilot channel pseudonoise (pn) sequence corresponding to the second finger, wherein producing the interference signal comprises correlating the despreading sequence with the pilot channel pn sequence;
   producing a correction signal corresponding to the first finger based on the interference signal and a received pilot signal corresponding to the second finger; and
   subtracting the correction signal from the local channel signal to produce a corrected local channel signal.

4. A method according to claim 3, wherein producing a corrected local channel signal further comprises:
   producing a second interference signal based on the despreading sequence associated with the first finger and a second pilot channel pn sequence corresponding to a third finger of the rake receiver, wherein the third finger is assigned to one of the local channel signal and a pilot channel signal from the interfering set of pilot channel signals; and
   producing a second correction signal corresponding to the first finger based on the second interference signal and a received pilot signal corresponding to the third finger,
   and wherein subtracting the correction signal further comprises subtracting the second correction signal from the local channel signal to produce the corrected local channel signal.

5. A method according to claim 3, wherein the first finger and the second finger are two fingers of n fingers of the rake receiver, wherein each finger is assigned to one of the local channel signal and a pilot channel signal from the interfering set of pilot channel signals, wherein producing a corrected local channel signal further comprises:
   producing n−1 interference signals corresponding to the first finger, each interference signal of the n−1 interference signals based on the despreading sequence associated with the first finger, and one of n−1 pilot channel pn sequences corresponding to the n fingers excluding the first finger; and
   producing n−1 correction signals corresponding to the first finger, each correction signal based on each interference signal of the n−1 interference signals and a received pilot channel signal corresponding to one of n fingers other than the first finger,
   and wherein subtracting the correction signal comprises subtracting the n−1 correction signals from the local channel signal to produce the corrected local channel signal.

6. A method according to claim 5, wherein producing a corrected local channel signal further comprises:
   producing a group of n−1 interference signals corresponding to each of the n fingers of the rake receiver other than the first finger that are assigned to the local channel signal;
   producing a group of n−1 correction signals corresponding to each of the n fingers of the rake receiver other than the first finger that are assigned to the local channel signal; and
   producing a corrected local channel signal for each of the n fingers other than the first finger that are assigned to the local channel signal, and wherein producing a corrected local signal for each of the n fingers other than the first finger comprises subtracting the group of n−1 correction signals from a corresponding local channel signal received by each of the n fingers other than the first finger.

7. A method according to claim 3, wherein producing a corrected local channel signal further comprises:
   interpolating a value of a pilot channel pseudonoise (pn) sequence corresponding to the second finger to produce a pilot channel pn sequence corresponding to the second finger; and
   digitally filtering the pilot channel pn sequence with a digital filter, the digital filter having an impulse response in accordance with a function equal to the convolution of an input impulse response of an input filter to the receiver and an output impulse response of a transmitter filter of a transmitter transmitting the pilot channel signal of the interfering set of pilot channel signals.

8. A method according to claim 7, wherein producing an interference signal comprises correlating the despreading sequence with the pilot channel pn sequence after the pilot channel pn sequence has been filtered in the digital filter.

9. A method according to claim 8, wherein producing the correction signal comprises multiplying the interference signal with the received pilot signal corresponding to the second finger.

10. A method according to claim 3, wherein producing a correction signal corresponding to the first finger comprises multiplying the interference signal and the received pilot signal.

11. A method according to claim 1, wherein selecting at least one interfering pilot channel signal comprises selecting at least one interfering pilot channel signal transmitted from at least one base station other than a local base station from which the mobile station receives a local pilot channel signal.

12. A method according to claim 1, wherein selecting at least one interfering pilot channel signal comprises selecting at least one interfering pilot channel signal originating separate from a local pilot channel signal, the at least one pilot channel signal and a local pilot channel signal each including respective multipath components.

13. A system for reducing interference within a local channel signal received during operation of the system in at least one of an idle state or an access state, the system comprising:
   a controller configured to select at least one interfering pilot channel signal that has a signal strength above a threshold, wherein the selected at least one interfering pilot channel signal constitutes an interfering set of pilot channel signals; and
   a finger demodulator assembly configured to produce a corrected local channel signal based upon the interfering set of pilot channel signals during the at least one of the idle state or the access state.

14. A system according to claim 13, wherein the controller is configured to repeatedly select at least one interfering pilot channel signal, wherein the finger demodulator assembly is configured to repeatedly produce a corrected local channel, and wherein the controller is further configured to repeatedly compare the selected interfering pilot channel signals to the threshold such that the controller is configured to remove a selected interfering pilot channel signal from the interfering set of pilot channel signals when the signal strength of the respective selected interfering pilot channel signal decreases below the threshold.

15. A system according to claim 13, wherein the finger demodulator assembly comprises:
   a rake receiver comprising:
      a first finger assigned to the local channel signal; and
      a second finger assigned to one of the interfering set of pilot channel signals;
   a cancellation element associated with the first finger, wherein the cancellation element is configured to produce an interference signal based on a despreading sequence associated with the first finger, and a pilot channel pseudonoise (pn) sequence corresponding to the second finger, wherein the cancellation element is configured to produce the interference signal by correlating the despreading sequence with the pilot channel pn sequence, and wherein the cancellation element is configured to produce a correction signal corresponding to the first finger based on the interference signal and a received pilot signal corresponding to the second finger; and
   a correction element associated with the first finger, wherein the correction element is configured to subtract the correction signal from the local channel signal to produce a corrected local channel signal.

16. A system according to claim 15, wherein the rake receiver further comprises:
   a third finger assigned to one of the local channel signal and a pilot channel signal from the interfering set of pilot channel signals,
   wherein the cancellation element is configured to produce a second interference signal based on the despreading sequence associated with the first finger and a second pilot channel pn sequence corresponding to the third finger, wherein the cancellation element is configured to produce a second correction signal corresponding to the first finger based on the second interference signal and a received pilot signal corresponding to the third finger,
   and wherein the correction element is configured to produce the corrected local channel signal by further subtracting the second correction signal from the local channel signal.

17. A system according to claim 15, wherein the rake receiver comprises n fingers including the first finger and the second finger, wherein each finger is assigned to one of the local channel signal and a pilot channel signal from the interfering set of pilot channel signals,
   wherein the cancellation element is configured to produce n−1 interference signals corresponding to the first finger, each interference signal of the n−1 interference signals based on the despreading sequence associated with the first finger, and one of n−1 pilot channel pn sequences corresponding to the n fingers excluding the first finger, wherein the cancellation element is also configured to produce n−1 correction signals corresponding to the first finger, each correction signal based on each interference signal of the n−1 interference signals and a received pilot channel signal corresponding to one of n fingers other than the first finger,
   and wherein the correction element is configured to produce the corrected local channel signal by subtracting the n−1 correction signals from the local channel signal.

18. A system according to claim 17, wherein the cancellation element comprises n cancellation elements, each cancellation element associated with one of the n fingers, wherein each cancellation element for each finger that is assigned to the local channel signal is configured to produce a group of n−1 interference signals corresponding to each of the n fingers of the rake receiver other than the finger associated with the respective cancellation element, wherein each cancellation element is also configured to produce a group of n−1 correction signals corresponding to each of the n fingers of the rake receiver other than the finger associated with the respective cancellation element,
   wherein the correction element comprises n correction elements, each correction element associated with one of the n fingers, wherein each correction element for each finger that is assigned to the local channel signal is configured to produce a corrected local channel signal for each of the n fingers of the rake receiver other than the finger associated with the respective correction element, and wherein each correction element is configured to produce the corrected local channel signal by subtracting the group of n−1 correction signals from the local channel signal assigned to the finger associated with the respective correction element.

19. A system according to claim 15, wherein the cancellation element further comprises a cancellation element associated with the second finger, wherein the cancellation element associated with the second finger is configured to interpolate a value of a pilot channel pseudonoise (pn) sequence corresponding to the second finger to produce a pilot channel pn sequence corresponding to the second finger, and wherein the cancellation element associated with the second finger includes a digital filter configured to digitally filter the pilot channel pn sequence, the digital filter having an impulse response in accordance with a function equal to the convolution of an input impulse response of an input filter to the receiver and an output impulse response of a transmitter filter of a transmitter transmitting the pilot channel signal of the interfering set of pilot channel signals.

20. A system according to claim 19, wherein the cancellation element associated with the first finger is configured to produce an interference signal by correlating the despreading sequence with the pilot channel pn sequence after the pilot channel pn sequence has been filtered in the digital filter.

21. A system according to claim 20, wherein the cancellation element associated with the first finger is configured to produce the correction signal by multiplying the interference signal with the received pilot signal corresponding to the second finger.

22. A system according to claim 15, wherein the cancellation element is configured to produce a correction signal corresponding to the first finger by multiplying the interference signal and the received pilot signal.

23. A system according to claim 13, wherein the controller is configured to select at least one interfering pilot channel signal transmitted from at least one base station other than a local base station from which the mobile station receives a local pilot channel signal.

24. A system according to claim 13, wherein the controller is configured to select at least one interfering pilot channel signal originating separate from a local pilot channel signal, the at least one pilot channel signal and a local pilot channel signal each including respective multipath components.

25. A system for reducing interference within a local channel signal received during operation of the system in at least one of an idle state or an access state, the system comprising:
 a controller configured to select at least one interfering pilot channel signal that has a signal strength above a threshold, wherein the selected at least one interfering pilot channel signal constitutes an interfering set of pilot channel signals;
 a rake receiver comprising:
  a first finger assigned to the local channel signal; and
  a second finger assigned to one of the interfering set of pilot channel signals; and
 noise reduction element associated with the first finger, wherein the noise reduction element comprises:
  a correlator configured to correlate an interpolated pilot channel pseudonoise (pn) sequence corresponding to the second finger with a despreading sequence corresponding to the first finger to produce an interference signal;
  a multiplier configured to multiply the interference signal with a received pilot signal corresponding to the second finger to produce a correction signal; and
  a subtractor configured to subtract the correction signal from the local channel signal to produce a corrected local channel signal.

26. A system according to claim 25, wherein the rake receiver further comprises:
 a third finger assigned to one of the local channel signal and a pilot channel signal from the interfering set of pilot channel signals,
 wherein the noise reduction element further comprises:
  a second correlator configured to correlate an interpolated pilot channel pn sequence corresponding to the third finger with the despreading sequence corresponding to the first finger to produce a second interference signal; and
  a second multiplier configured to multiply the second interference signal with a received pilot signal corresponding to the third finger to produce a second correction signal, and wherein subtractor is configured to further subtract the second correction signal from the local channel signal to produce a corrected local channel signal.

27. A system according to claim 25, wherein the rake receiver comprises n fingers including the first finger and the second finger, wherein each finger is assigned to one of the local channel signal and a pilot channel signal from the interfering set of pilot channel signals,
 wherein the noise reduction element comprises:
  n−1 correlators, each correlator configured to correlate one of n−1 pilot channel pn sequences corresponding to the n fingers excluding the first finger with the despreading sequence corresponding to the first finger to produce one of n−1 interference signals corresponding to the first finger; and
  n−1 multipliers, each multiplier configured to multiply one of the n−1 interference signals and a received pilot channel signal corresponding to one of n fingers other than the first finger to produce n−1 correction signals,
 and wherein the subtractor is configured to subtract the n−1 correction signals from the local channel signal to produce a corrected local channel signal.

28. A system according to claim 27, wherein the noise reduction element comprises n noise reduction elements, each noise reduction element associated with one of the n fingers of the rake receiver,
 wherein each correlator of each noise reduction element associated with a finger assigned to the local channel signal is configured to correlate one of n−1 pilot channel pn sequences corresponding to the n fingers other than the finger associated with the respective noise reduction element, with the despreading sequence corresponding to the finger associated with the noise reduction element including the respective correlator, to produce one of n−1 interference signals corresponding to the respective noise reduction element,
 wherein each multiplier of each noise reduction element associated with a finger assigned to the local channel signal is configured to multiply one of n−1 interference signals corresponding to the respective noise reduction element and a received pilot channel signal corresponding to one of n fingers other than the finger associated with the respective noise reduction element to produce one of n−1 correction signals corresponding to the respective noise reduction element,
 and wherein each subtractor of each noise reduction element associated with a finger assigned to the local channel signal is configured to subtract the n−1 correction signals corresponding to the respective noise reduction element from the local channel signal assigned to the finger associated with the respective noise reduction element to produce a corrected local channel signal.

29. A system according to claim 25, wherein the controller is configured to select at least one interfering pilot channel signal transmitted from at least one base station other than a local base station from which the mobile station receives a local pilot channel signal.

30. A system according to claim 25, wherein the controller is configured to select at least one interfering pilot channel signal originating separate from a local pilot channel signal, the at least one pilot channel signal and a local pilot channel signal each including respective multipath components.

* * * * *